(12) United States Patent
Rothaus

(10) Patent No.: US 10,298,976 B2
(45) Date of Patent: *May 21, 2019

(54) DATA DISTRIBUTION AMONGST TRANSPONDER CARRIERS

(71) Applicant: The DIRECTV Group, Inc., El Segundo, CA (US)

(72) Inventor: Robert J. Rothaus, Placentia, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,651

(22) Filed: Jul. 18, 2018

(65) Prior Publication Data

US 2018/0343474 A1 Nov. 29, 2018

Related U.S. Application Data

(63) Continuation of application No. 15/410,247, filed on Jan. 19, 2017, now Pat. No. 10,057,611, which is a continuation of application No. 14/586,210, filed on Dec. 30, 2014, now Pat. No. 9,584,838.

(51) Int. Cl.
| | |
|---|---|
| *H04N 7/20* | (2006.01) |
| *H04N 21/2385* | (2011.01) |
| *H04N 21/262* | (2011.01) |
| *H04N 21/2365* | (2011.01) |
| *H04N 7/12* | (2006.01) |
| *H04N 21/61* | (2011.01) |

(52) U.S. Cl.
CPC ........... *H04N 21/2385* (2013.01); *H04N 7/12* (2013.01); *H04N 7/20* (2013.01); *H04N 21/2365* (2013.01); *H04N 21/26216* (2013.01); *H04N 21/6143* (2013.01); *H04N 21/6193* (2013.01)

(58) Field of Classification Search
CPC ... H04N 21/440227; H04N 21/440263; H04N 21/631
See application file for complete search history.

(56) References Cited

U.S. PATENT DOCUMENTS

| 9,584,838 B2 * | 2/2017 | Rothaus ............. H04N 21/2385 |
| 10,057,611 B2 * | 8/2018 | Rothaus ............. H04N 21/2385 |
| 2009/0276811 A1 | 11/2009 | Ramaswamy et al. |
| 2010/0199301 A1 * | 8/2010 | Hayashi ................ H04H 20/28 725/32 |
| 2013/0071095 A1 | 3/2013 | Chauvier et al. |
| 2017/0013287 A1 | 1/2017 | Rothaus |
| 2017/0134767 A1 | 5/2017 | Rothaus |
| 2017/0163542 A1 | 6/2017 | Dajani et al. |

\* cited by examiner

*Primary Examiner* — Gigi L Dubasky
(74) *Attorney, Agent, or Firm* — Guntin & Gust, PLC; Douglas Schnabel

(57) ABSTRACT

A satellite broadcast system is used to transmit streams of variable bit-rate content using fixed bit-rate channels that correspond to respective satellite transponder carriers. High bandwidth content is transmitted over multiple transponder carriers in parallel with a combined bandwidth sufficient for the peak bit-rate of the high bandwidth content, whereas multiple streams of low bandwidth content can be transmitted over a single transponder carrier simultaneously by multiplexing the low bandwidth content. High bandwidth content may be multiplexed with low bandwidth content rather than assigning all high bandwidth content to be transmitted exclusively over dedicated high bandwidth transponders.

20 Claims, 7 Drawing Sheets

DATA DISTRIBUTION AMONGST TRANSPONDER CARRIERS

CROSS-REFERENCE TO RELATED APPLICATIONS

This application is a continuation of U.S. patent application Ser. No. 15/410,247, filed Jan. 19, 2017, which is a continuation of U.S. patent application Ser. No. 14/586,210 filed Dec. 30, 2014, now U.S. Pat. No. 9,584,838. The contents of each of the foregoing are hereby incorporated by reference into this application as if set forth herein in full.

BACKGROUND

Satellite broadcast systems are used to distribute audio, video, and data content to end users using a constellation of communication satellites. Media content is encoded on modulated radio frequency signals that are transmitted to the satellite network in an uplink transmission. The communication satellites are equipped with multiple transponders that process the incoming uplink signal and then transmit a frequency-shifted version of the uplink signal as the downlink signal. Satellite broadcast systems thereby allow for wirelessly distributing media content without a direct line of sight between the uplink station and each subscriber. As these systems have evolved, there has been an ongoing demand for additional bandwidth and/or more efficient use of existing bandwidth to carry an ever-increasing amount of content. Due to a combination of existing legacy hardware systems and regulatory issues, most content continues to be broadcast over a set of transmission channels with fixed bandwidth capacities.

In a simple version, each of the transponders may function as repeaters that emit a frequency-shifted version of a portion of the uplink signal. Together, a set of transponders on the satellite can be used to create a downlink signal on a set of carriers that each correspond to one of the transponders. Thus, the set of transponders on a satellite define a set of downlink carriers (channels) for reception at receiver stations on the ground for each subscriber. The receiver stations include an antenna (e.g., a satellite dish) for detecting the downlink signals and a set top box (STB) that receives signals detected at the antenna and extracts the digital media content streams from those signals. The STB can include various hardware components for tuning and demodulating the radio frequency downlink signals, signal processing electronics for decoding, applying error correction, and/or video drivers that convert the media data stream into instructions for driving a video display.

To ease bandwidth constraints, video data is generally compressed prior to transmission using techniques based on standards such as MPEG-2 and MPEG-4 and various other coder/decoder specifications (codecs). Video compression reduces the required bandwidth of a given video stream while maintaining high visual quality. Compression also results in a variable bit-rate data stream. In particular, video compression requires a relatively high bit rate to represent video scenes depicting rapid movement or scenes with high degree of textured scenery (e.g., a sporting event) whereas a relatively low bit rate is required to represent video scenes depicting a stable background scene with slow movement in the foreground (e.g., a news program).

To accommodate a variable bit-rate compressed video signal on a fixed bit-rate carrier channel, the bandwidth capacity of the carrier channel must exceed the peak bit-rate of the video signal. For most types of compressed video content, the peak bit-rate exceeds the average bit-rate by a significant amount. To make efficient use of the bandwidth capacity of the carrier channels, multiple compressed video signals may be multiplexed together using a statistical multiplexer prior to transmission over the fixed bit-rate carrier channels. Because the bit-rate peaks of the different compressed video signals are unlikely to occur simultaneously, the combined signal provides a data stream with a relatively more stable bit-rate to be transmitted over the fixed bit-rate carrier. The combined signal may have a bit-rate that corresponds to the bandwidth capacity of a single transponder carrier, and the combined signal can be transmitted using a single transponder.

In practice, additional bandwidth margin is required for error correction, overhead messaging, and accounting for occasional bit-rate peaks in the combined signal, but the statistical multiplexing process still provides spectral efficiency benefits when transmitting multiple variable bit-rate signals over fixed bit-rate channels, such as satellite transponder carriers.

In addition to the compression used, the bandwidth required to stream video data also depends on the resolution and frame rate of the underlying video. A digital video stream can be thought of as a series of images of a particular resolution as well as associated audio content. Each frame of a video is an image with pixels arranged in rows and columns. Video resolution is typically characterized by the number of rows of pixels in each frame image. The frame rate typically refers to the speed at which each frame is displayed as the video is played out. The frame rate may also be referred to as the refresh rate (e.g., the time between successive updates of a given pixel value). Progressive video updates each pixel of a frame at each frame refresh. Interlaced video updates alternating rows for each frame refresh. Thus, interlaced video requires less bandwidth than progressive video for a given resolution and frame rate of the same video content.

For example, standard definition (SD) video refers to a class of video content with frames having 480 rows that are progressively scanned and frame rates of about 24 or 30 frames per second. For shorthand, such SD video may be identified as 480p24 (i.e., 480 rows per frame, progressively scanned, at 24 frames per second) or 480p30 (i.e., 480 rows per frame, progressively scanned, at 30 frames per second). Similarly, high definition (HD) video may be identified as 720p24 (i.e., 720 rows per frame, progressively scanned, at 24 frames per second) or 1080i30 (i.e., 1080 rows per frame, interlaced, at 30 frames per second), or 1080p24 (i.e., 1080 rows per frame, progressively scanned, at 24 frames per second).

Existing satellite transponders have bandwidth capacities sufficient to carry a multiplexed stream of a combination of two to ten compressed video streams when the underlying video content is SD video or HD video (e.g., 480p24, 1080i30 or 720p24). Such video content is referred to as low bandwidth, because the bandwidth requirement of such content is low compared to the bandwidth capacity of an individual satellite transponder carrier. However, video content requiring higher bit rates is being introduced, such as 1080p60, high definition three-dimensional video (which requires twice the frame rate to separately display content for perception by the left and right eyes in alternating frames), and 4KTV, which has twice the number of rows as high definition television, and thus four times the number of pixels per frame (e.g., 2160p24). Such video content is referred to as high bandwidth, because the bandwidth requirement of such content is high compared to the bandwidth capacity of an individual satellite transponder carrier channel.

SUMMARY

In many cases the peak bit-rate of compressed high bandwidth video content exceeds the capacity of an individual transponder carrier. Yet the demand for high bandwidth content is increasing, and so satellite broadcasters developed a technique for transmitting high bandwidth content using multiple transponder carriers simultaneously. A high bandwidth video stream is compressed into a variable bit-rate signal, and the compressed signal is parsed into a series of data packets. The data packets for the single high bandwidth video stream are then divided across multiple transponder carriers and broadcast to subscribers via uplink and downlink transmissions for those transponder carriers. Then, to recover the high bandwidth content from the multiple downlink transponder carriers, a receiver STB uses multiple tuners and demodulators to demodulate signals on the multiple transponder carriers simultaneously. Data packets for the high bandwidth content are identified from the demodulated data and combined to reconstitute the high bandwidth digital video stream.

Techniques for transmitting high bandwidth content over multiple transponder carriers in parallel and then assembling the high bandwidth content at the STB by simultaneously demodulating multiple transponder carriers and combining the data packets for the high bandwidth content are referred to as transponder bonding. Similarly, transponder carriers that are used in parallel to carry high bandwidth content are referred to as transponder bonded carriers. The transponder carriers collectively provide a transmission channel with a bandwidth capacity comparable to the sum of the bandwidth capacities of the bonded carriers.

Prior to development of high bandwidth video data sources, such as 4KTV, STBs were not configured to receive transponder bonded signals. Such legacy STBs may include multiple tuner/demodulators to simultaneously tune and demodulate signals on multiple transponder carriers, and then extract video data streams within those carriers by filtering the demodulated signal for packets with particular identifiers. As such, legacy STBs may be used to simultaneously receive video streams on different transponder carriers (e.g., such as when one video program is being viewed while another is recorded for later viewing). However, many legacy STBs lack hardware capable of combining demodulated signals from multiple transponder carriers before decoding to recover a very high bandwidth data stream that can then be filtered based on packet identifiers, which is necessary to receive transponder bonded signals.

At present, there are tens of millions of such legacy STBs in use by subscribers and replacing those STBs with updated versions configured to receive transponder bonded signals would require a major investment in the range of several hundred dollars per unit. In particular, in addition to the transponder bonding functionality, each replacement unit would also include data storage for hosting locally recorded video content, video drivers for decoding video content and generating video driving signals, among other components.

The present disclosure provides a technique in which data for video-data streams is distributed amongst multiple transponder carriers, which may increase spectral efficiency while still allowing legacy STBs to be used for processing low bandwidth video data streams. In particular, a service provider can distribute data from low bandwidth video data streams such that all data for a given low bandwidth video data stream is assigned to a single transponder carrier. At the same time, data for high bandwidth video data streams can be distributed amongst multiple transponder carriers, including at least some transponder carriers that are also used for low bandwidth video data streams. As a result, any excess capacity on transponder carriers used for low bandwidth video data streams can be more efficiently used to carry at least some data from high bandwidth video data streams. The technique therefore allows for a single transponder carrier to be used for both data from low bandwidth video data stream(s) and data from high bandwidth video data stream(s) that is transponder bonded amongst multiple transponder carriers.

In some examples, packet identifiers can be used to identify data from different types of video data streams (i.e., high bandwidth or low bandwidth) and the packet identifiers can then be used by a distributor when assigning data from those data streams amongst transponder carriers. For example, packet identifiers in a first range can be assigned to data from low bandwidth video data streams and packet identifiers in a second range can be assigned to data from high bandwidth video data streams. The distributor can then account for the packet identifiers when assigning data packets to transponder carriers. For example, the distributor can determine whether a given data packet has a packet identifier in the first range or the second range. If the packet identifier is in the first range, the distributor can assign that data packet (and all data packets for the same video data stream) to a single transponder carrier. If the packet identifier is in the second range, the distributor can assign the data packet (and data packets for the same video data stream) to be divided amongst multiple transponder carriers.

The flexible data distribution approaches of the present disclosure may therefore help to increase spectral efficiency when transmitting high bandwidth video data streams to STBs configured for transponder bonding without interfering with the ability of existing legacy STBs to receive low bandwidth video data streams. The disclosed schemes therefore may help to overcome some or all the hardware limitations of legacy STBs and allows legacy STBs to be used to receive low bandwidth video data streams on certain transponder carriers while still allowing those transponder carriers to be used when transmitting transponder-bonded signals for high bandwidth video data streams.

In particular, in one example, a method is disclosed. The method can include receiving a plurality of video-data streams comprising one or more low bandwidth video-data streams and one or more high bandwidth video-data streams. The method can also include combining the plurality of video-data streams to generate a single combined data stream. The method can also include distributing the single combined data stream amongst a plurality of channels. Distributing the single combined data stream can include, for each of the one or more low bandwidth video-data streams, assigning all data from the low bandwidth video-data stream to a single one of the channels. Distributing the single combined data stream can also include, for at least one of the one or more high bandwidth video-data streams, assigning respective portions of data from the high bandwidth video-data stream to each of two or more of the channels. At least one of the two or more channels can be a common channel to which one of the low bandwidth video-data streams is also assigned, such that a portion of the data from the at least one high bandwidth video-data stream and all data from the one of the low bandwidth video-data streams are both assigned to the common channel.

In another example, a system is disclosed. The system can include an input interface configured to receive video-data streams comprising one or more low bandwidth video-data streams and one or more high bandwidth video-data streams. The system can also include a statistical multiplexer coupled to the input interface and a distributor coupled to the statistical multiplexer. The system can also include a control system operable to: (i) combine the video-data streams using the statistical multiplexer to generate a single combined data stream; and (ii) distribute the single combined data stream amongst a plurality of channels using the distributor such that: (a) for each of the one or more low bandwidth video-data streams, all data from the low bandwidth video-data stream is assigned to a single one of the channels, and (b) for at least one of the one or more high bandwidth video-data streams, respective portions of data from the high bandwidth video-data stream are assigned to each of two or more of the channels. At least one of the two or more channels can be a common channel to which one of the low bandwidth video-data streams is also assigned, such that a portion of the data from the at least one high bandwidth video-data stream and all data from the one of the low bandwidth video-data streams are both assigned to the common channel.

Also disclosed herein are structures configured to facilitate implementation of the disclosed methods. One embodiment may take the form of a computing device (e.g., a communication device, computing system, etc.) that includes a communication interface, a processor, data storage, and program instructions executable by the processor for carrying out the functions described herein. Another embodiment may take the form of a non-transitory computer-readable medium having instructions stored thereon for carrying out some or all of the functions described herein.

The foregoing summary is only provided for example purposes and is not intended to be in any way limiting. In addition to the aspects, embodiments, and features described above, further aspects, embodiments, and features will become apparent by reference to the drawings and the following detailed description.

BRIEF DESCRIPTION OF THE DRAWINGS

Various embodiments are described herein with reference to the following drawings, in which like numerals denote like entities.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. EXAMPLE DIGITAL BROADCAST SYSTEM

Figure 1:
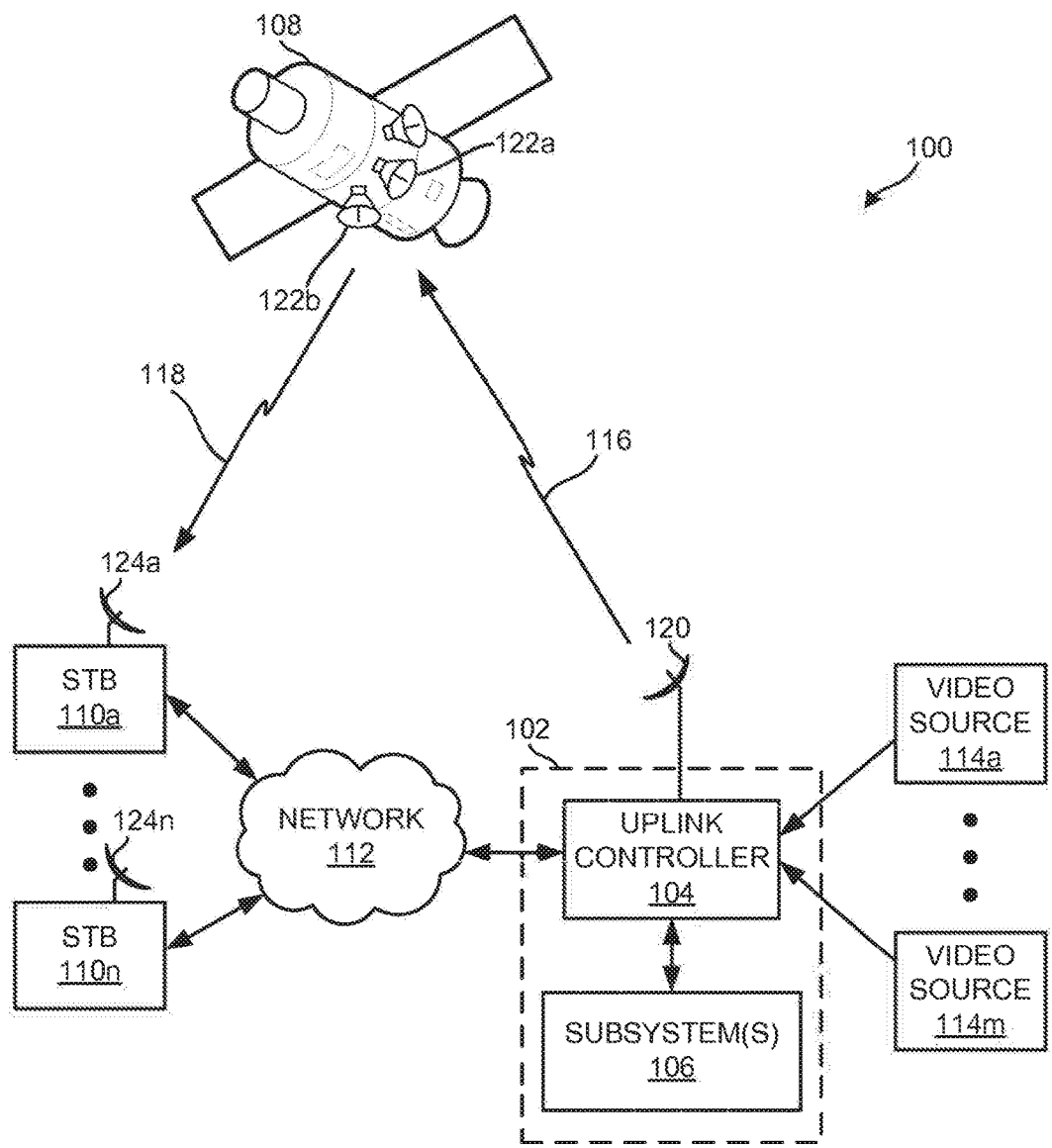
FIG. 1 is a functional block diagram of an example digital broadcast system.

FIG. 1 is a simplified block diagram that illustrates a digital broadcast system 100. The digital broadcast system 100 includes a content distribution system 102, a satellite 108, and one or more receiver stations 110a, 110n. The receiver stations 110a, 110n may communicate with the content distribution system 102 via network 112. The content distribution system 102 includes an uplink controller 104 that receives one or more data streams from video sources 114a, 114m and operates an uplink antenna 120 to transmit an uplink signal 116 indicative of the received data stream(s). The satellite 108 includes one or more antennas 122a, 122b and various signal processing subsystems. Using one or more of the antennas 122a, 122b and/or signal processing subsystems, the satellite 108 receives the uplink signal 116 transmitted from the uplink antenna 120 and transmits the downlink signal 118 to the receiver stations for individual subscribers. In some examples, a single antenna may be used to receive data via an uplink signal and transmit data via a downlink signal. Other examples are also possible.

Each receiver station includes an antenna for receiving the downlink signal 118 and a set top box (STB) with electronics for processing the antenna signal to extract the video content. For example, the first receiver station includes antenna 124a and STB 110a. The STB 110a includes one or more tuners, demodulators, decoders, and/or other signal processing subsystems configured to extract video data streams from the downlink signal 118 received at the antenna 124a. Additional aspects of the STB are described below in connection with FIG. 2.

The data streams distributed by the content distribution system 102 may be data indicative of video and/or audio content from one or more content providers (e.g., programming from various networks, real time video coverage of live events, and/or previously recorded video content, such as movies and the like). Thus, the video sources 114a, 114m may include television broadcast stations that are communicatively linked to the content distribution system 102 via wireless and/or wireline networks. In some examples, the video sources 114a, 114m may include previously recorded video data stored on data storage in communication with the content distribution system 102 and/or data storage included in the content distribution system 102.

The uplink controller 104 can process the incoming video data streams so as to encode the video data streams onto one or more transponder carriers of the satellite 108. In some examples, the uplink controller 104 may apply various error correction schemes to ensure data packets are accurately received. The uplink controller 104 may also apply various encryption schemes to ensure that broadcast signals are successfully received (e.g., decrypted) by subscribers to the service provider that operates the content distribution system 102. In some cases, information for decrypting and/or decoding the broadcast signals can be sent to subscribers STBs 110a, 110n via the network 112.

In addition to error correction and/or encryption, the content distribution system 102 may also include various subsystems 106 for performing additional functions related to distributing audio and/or video content for reception by subscribers. The subsystems 106 may include a guide management system that includes information indicative of content broadcast by the content distribution system 102. The guide management system may provide information that can be used by STBs 110a, 110n to render a guide to available content that users can navigate via a user interface of the STBs 110a, 110n and thereby select particular programming from amongst the available content. Once particular content is selected, the STBs 110a, 110n can then demodulate, decode, and/or decrypt signals corresponding to that content and provide the resulting video data for viewing and/or recording. In some examples, the subsystems 106 may also include a subscriber account subsystem which functions to manage accounts for individual subscribers. Among other aspects, the subscriber account subsystem may manage subscriber authentication (e.g., passwords), allow for subscribers to tender payments, manage subscription (e.g., channels subscribed to), manage viewing preferences, etc. The content distribution system 102 may alternatively be referred to as a head end of the system 100.

In some examples, content distribution system 102 may communicate data to STBs 110a, 110n via network 112. For example, in response to a request from a subscriber, content distribution system 102 may stream particular requested video content to that subscriber's STB via network 112 when that content is not currently being broadcast via uplink/downlink signals 116, 118. Network 112 may be representative of one or more types of networks, such as a wide area packet switched network (e.g., the Internet), public switched telephone network, a mobile telephone network, or another type of communication network.

In some examples, STBs 110a, 110n may be interconnected with one or more devices via a local network for an individual subscriber (not illustrated). The local network, which may be a wired network or wireless network, may be used to interconnect STBs within a household, multi-dwelling unit, or commercial building. The local network may also allow for multi-room viewing of content stored on a first STB (such as set-top box 110a) and communicated to a second STB through the local network. The stored content can comprise content the STB 110a receives via antenna 124a and records to local data storage within the STB 110a, such as a hard drive unit.

It should be understood that, although not illustrated, multiple satellites, head ends, servers, and other components might be included in the digital broadcast system 100. Moreover, while multiple components are illustrated separately, it should be understood that one or more of the components may be implemented as distributed components that are in communication with one another.

II. EXAMPLE RECEIVER STATION

Figure 2:
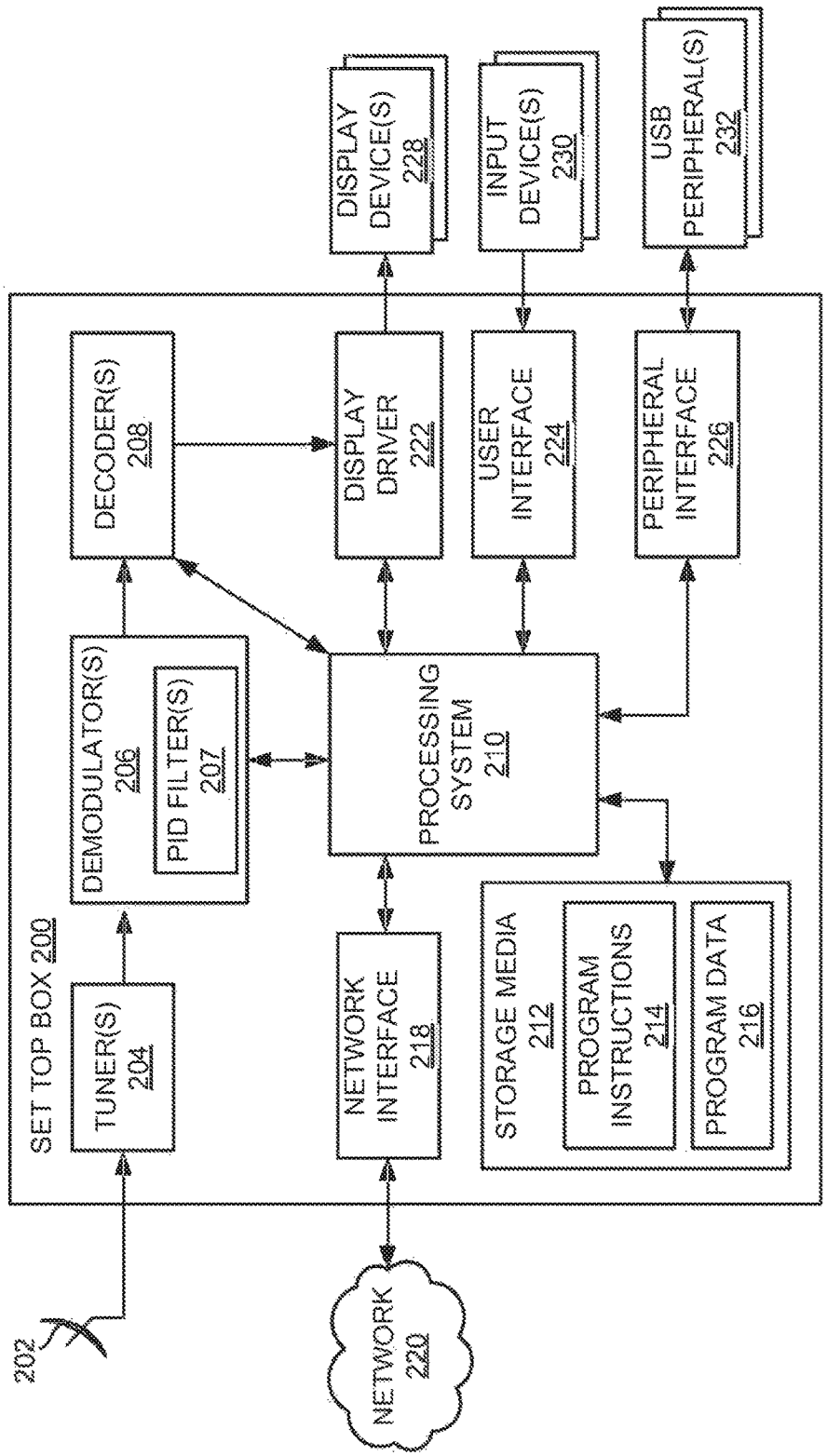
FIG. 2 is a functional block diagram of an example receiver system for a digital broadcast subscriber.

FIG. 2 is a functional block diagram of an example receiver system 200 for a digital broadcast subscriber. The receiver system 200 may be implemented as a computing device in a variety of forms, but is described herein as a set-top box (STB). For example, the receiver station 200 may comprise or be arranged as the STBs 110a, 110n of FIG. 1. The STB 200 may be a computing device used for operating television systems or other media display.

The STB 200 includes a tuner 204, a demodulator 206, a packet ID filter 207, a decoder 208, a processor 210, a memory 212, one or more storage devices 212, a user interface 224, a network interface 218, and a display driver 222. In some examples, the STB 200 may include multiple tuners, demodulators, and/or packet ID filters for receiving signals on multiple carriers in parallel. The components described in FIG. 2 may be communicatively linked by a system bus, network, or other connection mechanism. It is noted that the block diagram of FIG. 2 is not intended to illustrate each and every aspect of the STB 200, but instead illustrates certain components involved in receiving and processing video data streams. For instance, the STB 200 includes a power supply, although that is not specifically illustrated. Moreover, the connections shown in FIG. 2 illustrate the path of some data communicated between various components, and is not intended to provide an exhaustive diagram of all electrical and/or communication connections.

The STB 200 also includes a peripheral interface 226 for coupling to peripheral components 232. The peripheral interface 226 may include a universal serial bus (USB) terminal, or another terminal for communicating data signals. In some cases, the peripheral interface 226 may also be used to provide power supply to peripheral components 232.

The STB 200 includes inputs for receiving a signal from a satellite antenna 202 (e.g., a coaxial port). The antenna 202 may be one of a number of different types of antennas that may include one or more low noise blocks down converters (LNB) associated therewith. For instance, antenna 202 may be a single antenna for receiving signals from a satellite (such as the downlink signal 118 transmitted from satellite 108 of FIG. 1). In some cases, the antenna 202 may additionally or alternatively be used to receive signals broadcast from terrestrial sources. In another instance, antenna 202 may include multiple antennas for receiving signals from satellites in different orbital slots. In yet another instance, signals and other items described as being received by antenna 202 can be received by network interface 218 by way of a coaxial cable, antenna, or another component for communicating information over network 220. In that regard, one or more signals or items received at network interface 218 may be forwarded to tuner 204 (e.g., via a signal splitter).

The antenna signal received at tuner 204 may be a modulated signal that includes encoded data indicative of audio and/or video content on multiple carriers. The content of the signal may vary based on the type of signal. For example, the content may include television programming content (e.g., a television signal), program guide data or other types of data. The tuner 204 can be configured to filter the incoming signal to select a frequency range associated with a single carrier, and convert that frequency range to baseband. Tuner 204 communicates the resulting signal to demodulator 206.

Demodulator 206 receives the signal from the tuner 204 and demodulates the signal to generate a demodulated signal (e.g., a demodulated data stream). The demodulator 206 may include or be associated with various signal processing modules, such as the packet ID filter 207 and/or other modules. For instance, the demodulated data stream may be processed in accordance with an error correction algorithm. For a given carrier, the demodulated data stream generated by the demodulator 206 may include multiple video data streams multiplexed together. Data packets for each stream within such a multiplexed stream are identified by packet identifiers. The packet ID filter 207 is configured to filters the demodulated data stream for data packets that correspond to a desired data stream. The packet ID filter 207 may, for example, identify packets for a desired data stream based on the packet identifiers of those data packets, and then use the identified data packets to generate the desired data stream. The filtered, demodulated data stream may be provided to decoder 208, which may decode the demodulated signal to form a decoded signal or decoded data. The decoded signal may be sent to processor 210 and/or display driver 222. However, other examples are also possible in which data is extracted based on signals received at the antenna 202.

The processing system 210 may include any type of processor, such as a microprocessor, a microcontroller, a digital signal processor (DSP), multicore processor, etc. Processor 210 may be used to coordinate or control tuner 204, demodulator 206, packet ID filter 207, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

Storage media 212 may include program logic 214 and program data 216. Program logic 214 may include programming instructions, such as computer executable or logic-implemented instructions. In some examples, the programming instructions may be provided or otherwise obtainable in a downloadable format, such as via network 220 (e.g., network 112 in FIG. 1). Program data 216 may include program information that can be directed to various data types. For instance, program data 216 and/or program instructions 214 may include one or more applications that, when executed by the processor 210, cause one or more processes to be carried out in accordance with algorithms indicated by the program instructions 214. Program data 216 may also include data (such as customer account information) that may be stored in STB 200. In some cases, the storage media 212 may also include a storage device such as a hard drive that can be used to store recorded content for subsequent playback in accordance with user inputs.

Generally, storage media 212 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device. In some cases a memory bus can be used for communicating between the processor 210 and storage media 212.

In some implementations, storage media 212 may be distributed between one or more locations and/or devices. For example, at least a portion of memory may reside within processor 210. In another example, all or part of memory may reside on a data storage device. Data storage devices included in the STB 200 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

STB 200 may also include a user interface 224 that is configured to allow a subscriber to interact with STB 200 via one or more input devices 230. In some examples, the input device 230 may include a remote control (or more simply, a remote), keyboard, a computer mouse, one or more push buttons, a touch screen, a smart phone, a tablet PC, a voice activated interface, or another system for receiving input. Moreover, in some cases, user input may be communicated via the network interface 218 and/or peripheral interface 226. Input device 230 may be used, for example, to select a channel, select information, change the volume, change the display appearance, or other functions using user interface 224. The process of making a selection with input device 230 may take a variety of forms and may involve an action taken by a user which is detected in some manner by the input device(s) 230, which then sends data indicative of the detected action to the STB 200.

The network interface 218 may take a variety of forms and function to allow the STB 200 to send and receive data via the network 220. For example, network interface 218 may be an Ethernet, MoCA, WiFi, WiMax, WiMax mobile, data over cable service interface specification (DOCSIS), wireless, cellular, or other types of interfaces. Moreover, network interface 218 may use a variety of protocols for communicating via the network 220. For instance, network interface 218 may communicate using Ethernet, a Transmission Control Protocol/Internet Protocol (TCP/IP), a hypertext transfer protocol (HTTP), or some other protocol.

STB 200 can also be coupled to a display 228. Display 228 may be a television, monitor, or other device configured to display images. The images may be video, graphics, text, or any variety of other visual representations rendered in accordance with content indicated by the STB 200. In some examples, the display 228 may include a pixelated display of elements which can be controlled to adjust their emissivity, transmissivity, and/or reflectivity so as to render images on the pixelated display. The display 228 may also include electronics for generating driving signals to operate the display elements based on received a video data streams. In some implementations, the display 228 may also include video processing modules for decompressing received compressed video data to decompressed video that can be used to drive the display elements (i.e., codecs), as well as applying various video effects, such as color and/or brightness corrections, compensation for mura, etc. Thus, in some examples, functionality of one or more aspects of video processing components shown in FIG. 2, such as the decoder 208 and/or display driver 222, may be performed in whole or in part by the display 228. In such examples, the data provided to the display 228 from the STB 200 may be a compressed video data stream generated by the tuner 204, demodulator 206, and PID filter 207. In some examples, the display 228 may include an audio output, such as a loudspeaker, to generate sound waves from media signals received by display 228.

Furthermore, in some cases the STB 200 may be configured to use the network interface 218 to send a video data stream to the display 228. For instance, the STB 200 may output a compressed video data stream through the network interface 218. The video data stream can then be conveyed to the display device 228 via a local area network, such as a television or another client compliant with the RVU protocol (e.g., a device configured to receive a video data stream from a STB via a local network connection, and then render the received video data stream on an integrated display). In some cases, the network interface 218 may include a multimedia over coaxial cable interface (e.g., an interface compliant with the Multimedia over Coaxial Alliance (MoCA) protocols) for communicating data streams via a coaxial cable connection. Thus, the display device 228 may include a network interface for receiving a compressed video data stream, and various video processing electronics (e.g., codecs, modules for providing compensation and/or corrections, etc.) that use the network-delivered video data stream to generate driving signals for an array of display elements based on the received video data stream.

The STB 200 includes a display driver 222 for communicating with the display 228. In some examples, display driver 222 may work in conjunction with a graphics processing unit (not illustrated), which can be configured to communicate with display device 228. Display driver 222 may communicate with display device 228 by a high-definition multiple interface (HDMI) cable, a coaxial cable, some other wired communication link, or via a wireless connection. In some examples, computing device 200 may communicate directly or indirectly with one or more additional devices, either via network 220, peripheral interface 226, or through additional interfaces. Communication may be embodied by computer-readable instructions, data structures, program modules, or other data in a modulated data signal, such as a carrier wave or other transport mechanism. By way of example, and not limitation, communication media 236 can include wired media such as a wired network or direct-wired connection, and wireless media such as acoustic, radio frequency (RF), infrared (IR) or other wireless media.

In an example operation, a user uses the input device 230 to provide an indication of a particular video data stream to extract from an incoming satellite signal (e.g., by selecting a channel via a content guide interface rendered on the display device 228). Based on the received user input, the processing system 210 operates the tuner 204, demodulator 206, and packet ID filter 207 to tune to a carrier associated with the particular video data stream, demodulate that signal, and filter the data in the demodulated signal. The processing system 210 can then operate the display driver 222 and/or storage media 212 to communicate with the display device 228 so as to render the video data stream and/or record the video data stream to a data storage device. As such, the STB 200 can be used by a subscriber to a digital broadcast system to receive, process, and make use of digital video data broadcast by a service provider over a satellite communication network (e.g., the digital broadcast system 100 of FIG. 1).

III. EXAMPLE DIGITAL BROADCAST SCHEMES

As noted above, a digital broadcast system can be used to distribute video data streams to subscribers using signals broadcast through a satellite communication network. However, digital video data is compressed prior to transmission in order to conserve bandwidth resources (e.g., in accordance with various compression standards such as MPEG, MPEG-4, H.264, HEVC, among other possibilities). Because video compression algorithms result in different bit rates depending on the spatial frequency (e.g., texture) of video content and also depending on the temporal frequency (e.g., motion) of the video content. As such, the compressed data streams are variable bit-rate data streams characterized by a peak bit rate and an average bit rate. Due to hardware and/or regulatory limitations, uplink and downlink transmission to and from a satellite communication network use a set of fixed bit-rate carriers.

A. Low Bandwidth Video Data

To efficiently use the available spectral resources, satellite broadcast service providers therefore use a statistical multiplexer (STATMUX) that combines together data packets of compressed video data streams into a single data stream which has a peak bandwidth within the capacity of an individual carrier. Because the peak data rates of the different video data streams do not align in time, the combined data stream has a lower peak bandwidth than the sum of the peak bandwidths of the constituent data streams, which may improve spectral efficiency. At the service provider head end, the carrier-specific combined data stream can then be encoded, error corrected, encrypted, and modulated onto the particular carrier, which is transmitted via an uplink transmission. The satellite is equipped with multiple transponders each configured to receive a particular modulated carrier and transmit a corresponding downlink signal. The downlink signal from the satellite therefore includes modulated data at each of the carriers of the satellite transponders. At a receiver station (e.g., STB), one or more of the carriers can be tuned and demodulated, decoded, and/or decrypted to recover the combined data stream. Data packets for a desired video data stream can then be identified from the combined stream to extract the desired video within the STB. This process is shown in connection with FIGS. 3A and 3B.

Figure 3A:
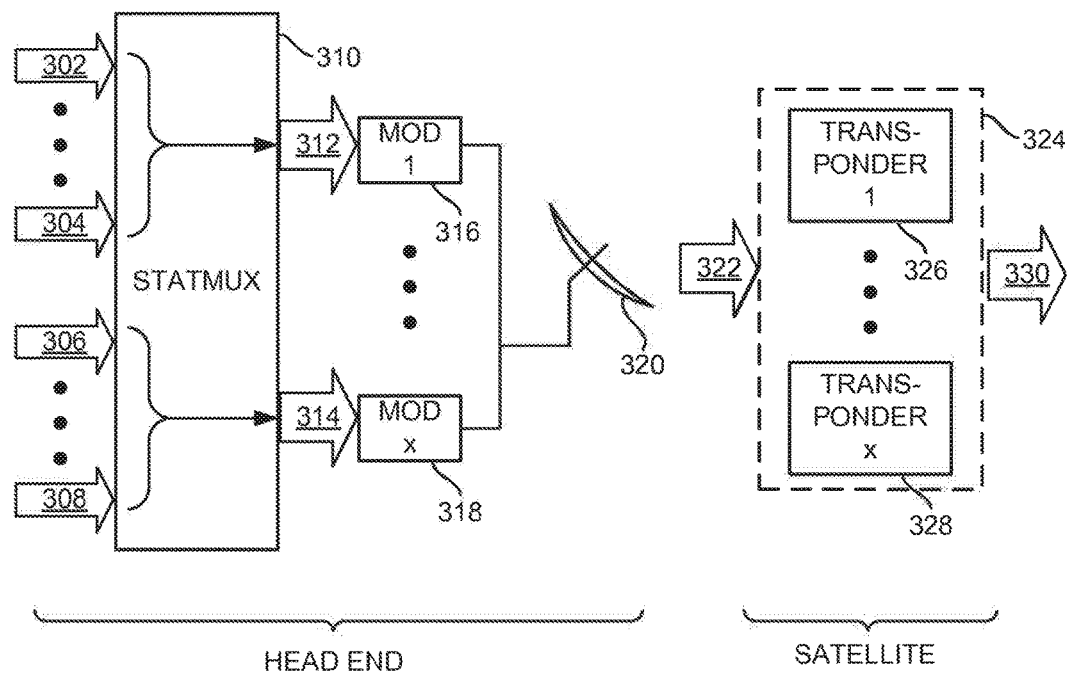
FIG. 3A is a diagram that shows distribution of low bandwidth video data streams amongst individual transponder carriers.
Figure 3B:
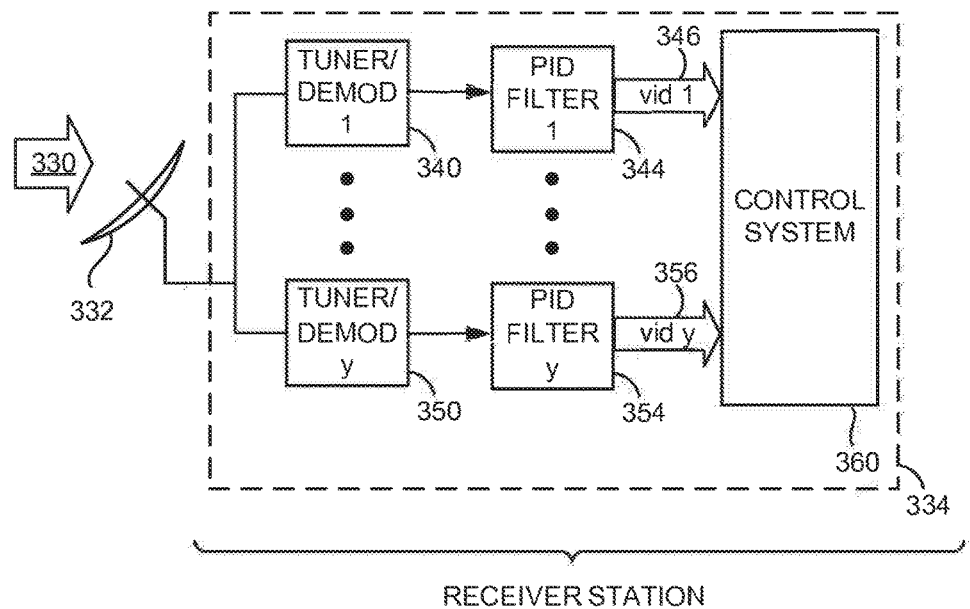
FIG. 3B is a diagram that shows a receiver system processing low bandwidth video data streams from a satellite signal.

FIG. 3A is a diagram that shows distribution of low bandwidth video data streams amongst individual transponder carriers. FIG. 3B is a diagram that shows a receiver system 334 processing low bandwidth video data streams from a satellite downlink signal 330.

For instance, multiple variable bit rate compressed video data streams 302-308 can be provided to a head end of a content distribution system (e.g., the digital broadcast system 100 of FIG. 1). A statistical multiplexer 310 combines groups of the low bandwidth data streams into combined data streams for transmission over individual transponder carriers. For example, STATMUX 310 may combine data streams 302-304 to generate data stream 312 and data streams 306-308 to generate data stream 314. The combined data streams 312, 314 can then be processed to apply error correction and/or encryption and then the processed data can be modulated onto respective carriers using modulators 316, 318. A separate modulator may be provided for each carrier of the transmission system. Thus, the combined data stream 312 can be processed/modulated via modulator 316 and the combined data stream 314 can be processed/modulated via modulator 318. The modulated signals can then be provided to uplink antenna 320, which transmits the uplink signal 322 to satellite 324. At the satellite 324, each transponder carrier within the uplink signal 322 can be processed by a respective transponder 326, 328, which generates a corresponding downlink signal. The resulting downlink signal 330 thus corresponds to the uplink signal 322 and includes information indicative of the original video data streams 302-308.

At the receiver station, shown in FIG. 3B, the downlink signal 330 is received by an antenna 332, which is coupled to a STB 334. The incoming antenna signal is then processed by a set of tuner/demodulators, and packet ID filters to extract desired video data streams that are processed by a control system 360. The STB 334 can function similarly to the STB 200 described above in connection with FIG. 2 to extract particular video data streams in accordance with user input and display that content on one or more displays or record that content for later viewing. The STB 334 can include multiple sets of tuner/demodulators and packet ID filters so as to extract multiple low bandwidth video data streams in parallel, such as when one incoming video program is being viewed and one or more additional programs are being recorded for later viewing or displayed on another display device.

Thus, as shown in FIG. 3B, a first video data stream 346 can be extracted using a first tuner/demodulator 340, which tunes to a carrier associated with video data stream 346 and provides a demodulated signal for that carrier to a first packet identifier filter 344, which identifies particular data packets within the combined data stream with packet identifiers that correspond to the desired video data stream 346. The packet ID filter 344 then filters the combined data stream to extract only the packets for the desired video data stream 346, which is then provided to the control system. Similarly, another tuner/demodulator 350 and packet ID filter 354 can be used to extract another video data stream 356 on another carrier and with another set of packet identifiers.

The carriers and packet identifiers for particular video data streams for particular video data streams can be identified by the control system 360 based on overhead messaging provided to the control system 360 via another channel of the incoming antenna signal 330 (or perhaps via a network connection) and which indicates carriers, packet identifiers, decryption algorithms, etc., for a given video data stream that may be selected for viewing/recording by a subscriber.

B. High Bandwidth Video Data—Transponder Bonding

However, when the bandwidth required by individual video data streams is comparable to the capacity of the individual transponder carriers, the spectral efficiency gains from using the STATMUX are largely negated as there is not enough bandwidth to efficiently mix together different data variable bit-rate streams. Therefore, for high bandwidth video data streams, such as 4KTV, 3DTV, and other high bandwidth content, satellite broadcast service providers combine such high bandwidth video data streams into a single combined data stream that can be broadcast over a group of multiple transponder carriers in parallel. This process is shown in connection with FIGS. 4A and 4B.

Figure 4A:
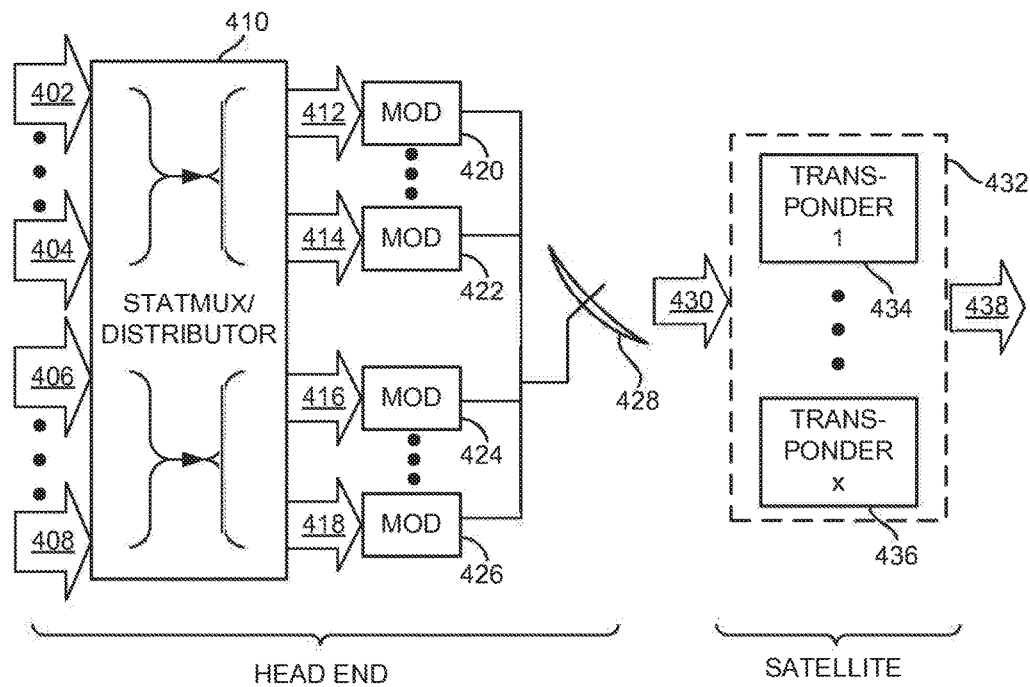
FIG. 4A is a diagram that shows distribution of high bandwidth video data streams amongst multiple transponder carriers.
Figure 4B:
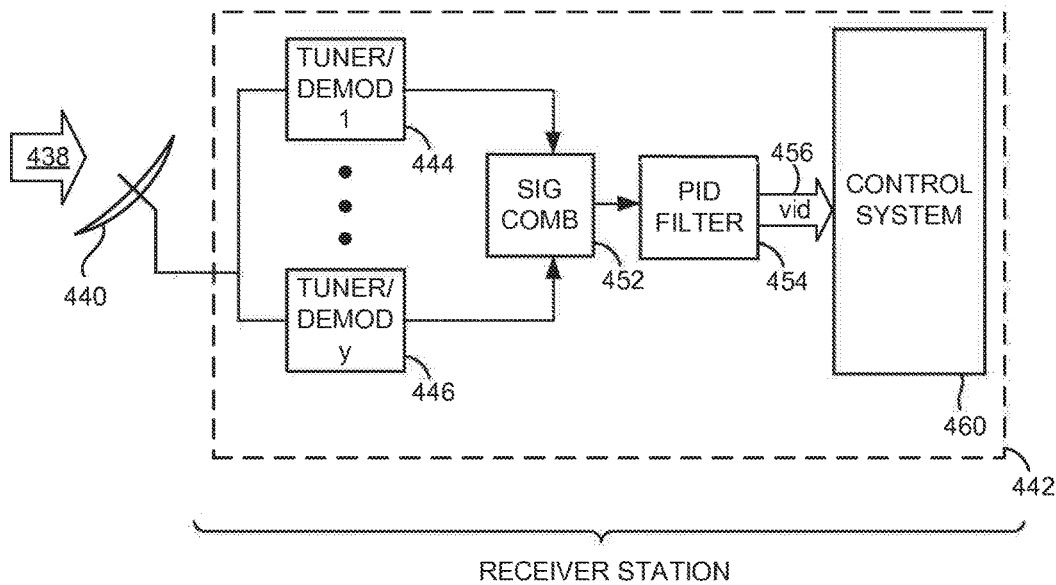
FIG. 4B is a diagram that shows a receiver system processing a high bandwidth video data stream from a satellite signal.

FIG. 4A is a diagram that shows distribution of high bandwidth video data streams amongst multiple transponder carriers. FIG. 4B is a diagram that shows a receiver system processing a high bandwidth video data stream from a satellite signal. For instance, multiple variable bit rate compressed video data streams 402-408 can be provided to a head end of a content distribution system (e.g., the digital broadcast system 100 of FIG. 1). A statistical multiplexer 410 combines groups of the high bandwidth data streams into combined data streams for transmission over multiple transponder carriers. For example, STATMUX 410 may combine high bandwidth video data streams 402-404 to generate a first combine data stream (i.e., a very high bandwidth data stream), and then the first combined data stream can be distributed amongst multiple transponder carriers to generate a set of data streams 412-414. Similarly, high bandwidth video data streams 406-408 may be combined to generate another combined data stream (i.e., a very high bandwidth data stream), and then the combined data stream can be distributed amongst multiple transponder carriers to generate another set of data streams 416-418. Prior to distributing the combined very high bandwidth data stream, the multiplexer/distributor 410 (or another subsystem) may apply various processes, such as error correction encoding, encrypting, etc. The combined very high bandwidth data stream is then divided into portions that are assigned to each transponder carrier, and each portion is marked to allow the very high bandwidth combined data stream to be reassembled upon receipt (e.g., with header data that indicates the relationship of each portion with respect to others).

The statistical multiplexer 410 of FIG. 4A is therefore a combined multiplexer and distributor, because it first combines high bandwidth variable bit-rate video data streams into a single combined data stream and then distributes the combined data stream across fixed bit-rate transponder carriers. It is noted that some examples of head ends may include separate modules that perform the statistical multiplexing and distributing functions, respectively. In some cases, the statistical multiplexer/distributor 410 may function such that data for one or more high bandwidth video data streams are distributed amongst three transponder carriers. Once generated, the data streams for each transponder carrier can be modulated using modulators 420-426. A separate modulator may be provided for each carrier of the transmission system. Thus, the combined data stream for high bandwidth video data streams 402-404 can be distributed amongst data streams 412, 414, and those data streams 412, 414 can be modulated via modulators 420, 422. Similarly, the combined data stream for high bandwidth video data streams 406-408 can be distributed amongst data streams 416, 418, and those data streams 416, 418 can be modulated via modulators 424, 426. The modulated signals can then be provided to uplink antenna 428, which transmits the uplink signal 430 to satellite 432. At the satellite 432, each transponder carrier within the uplink signal 430 can be processed by a respective transponder 434, 436, which generates a corresponding downlink signal 438. The resulting downlink signal 438 thus corresponds to the uplink signal 430 and includes information indicative of the original high bandwidth video data streams 402-408.

At the receiver station, shown in FIG. 4B, the downlink signal 438 is received by an antenna 440, which is coupled to a STB 442. The incoming antenna signal is processed by a set of tuner/demodulators 444, 446, a signal combiner 442, and a packet ID filter 454 to extract a desired video data stream 456 that is processed by a control system 460. In some respects, the STB 442 can function similarly to the STB 200 described above in connection with FIG. 2 to extract particular video data streams in accordance with user input and display that content on one or more displays or record that content for later viewing.

Thus, as shown in FIG. 4B, a first high bandwidth video data stream 454 can be extracted using a group of tuner/demodulators 444, 446, which tune to respective carriers associated with video data stream 456 and provide demodulated signals for those carriers. The tuner/demodulators 444, 446 may be tuned to demodulate signals used to carry a data stream distributed across multiple carriers (i.e., the set of carriers used to carry the data stream including the high bandwidth video data stream 456). The resulting data stream is provided to the signal combiner 452. The signal combiner 452 may be configured to assemble the demodulated signals using markers that indicate the relative relationship amongst portions of the very high bandwidth data stream from each transponder carrier. The signal combiner 452 provides the combined, very high bandwidth data to the packet ID filter 454, which identifies particular data packets within the combined data stream with packet identifiers that correspond to the desired video data stream 456. The packet ID filter 454 then filters the combined data stream to extract only the packets for the desired video data stream 456, which is then provided to the control system 460.

The carriers and packet identifiers for particular video data streams for particular video data streams can be identified by the control system 460 based on overhead messaging provided to the control system 460 via another channel of the incoming antenna signal 438 (or perhaps via a network connection) and which indicates carriers, packet identifiers, decryption algorithms, etc., for a given video data stream that may be selected for viewing/recording by a subscriber.

FIG. 4B shows components used to extract a single high bandwidth video data stream 456 from a group of transponder carriers, although some examples may include additional tuner/demodulators, signal combiners, and packet ID filters to allow for simultaneously extracting multiple high bandwidth video data streams. Thus, some examples may allow for operations when one incoming high bandwidth video program is being viewing and one or more additional high bandwidth video programs are being recorded for later viewing or displayed on another display device.

C. Mixed Bandwidth Content Distribution

To further enhance spectral efficiency gains of the statistical multiplexer, data can be distributed amongst transponder carriers by mixing data from low bandwidth video data streams and high bandwidth video data streams into a single combined data stream. However, such an approach, done naively, would result in all STBs being required to use transponder bonding to receive any video data streams, even low bandwidth video data streams. To overcome this, the present disclosure provides for distributing data amongst transponder carriers in an intelligent manner that accounts for the type of video data stream (e.g., low bandwidth or high bandwidth). In particular, for each low bandwidth video data stream, all data from that stream is assigned to a single transponder carrier such that the low bandwidth video data stream can be extracted by a receiver station that is not equipped for transponder bonding. At the same time, data from high bandwidth video data streams can be divided amongst multiple transponder carriers, including at least some transponder carriers also used for low bandwidth video data. As a result, excess capacity on transponder carriers previously used exclusively for low bandwidth video data can be more efficiently utilized to transmit data for high bandwidth video data streams.

Figure 5A:
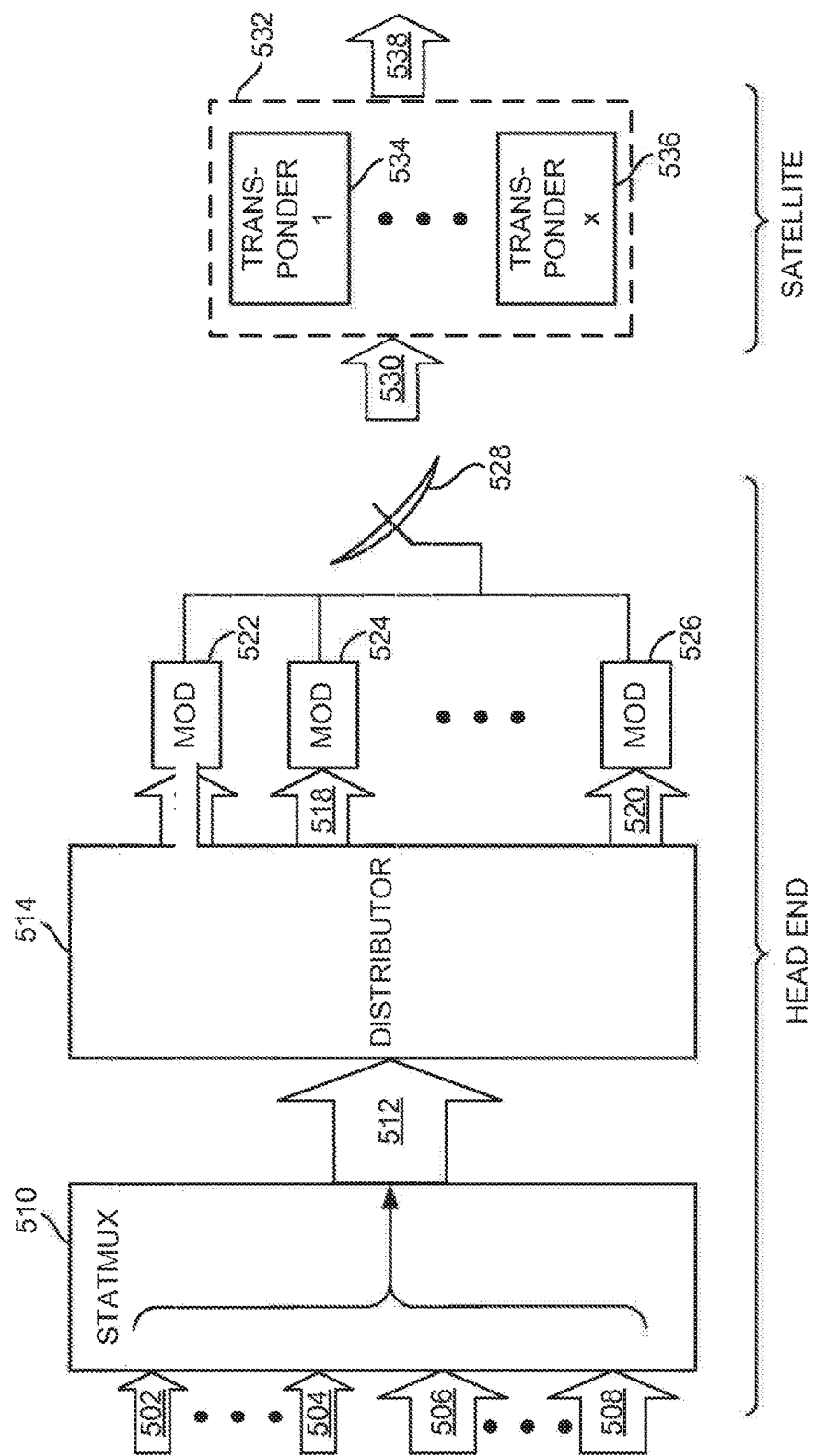
FIG. 5A is a diagram that shows distribution of low bandwidth video data streams and high bandwidth video data streams amongst multiple transponder carriers.
Figure 5B:
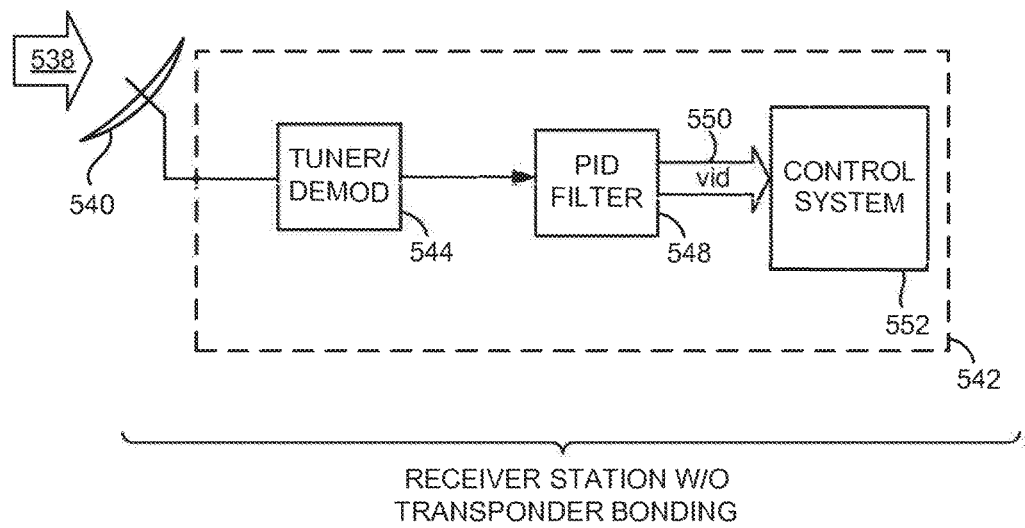
FIG. 5B is a diagram that shows a STB receiving a low bandwidth video data stream from a satellite signal.
Figure 5C:
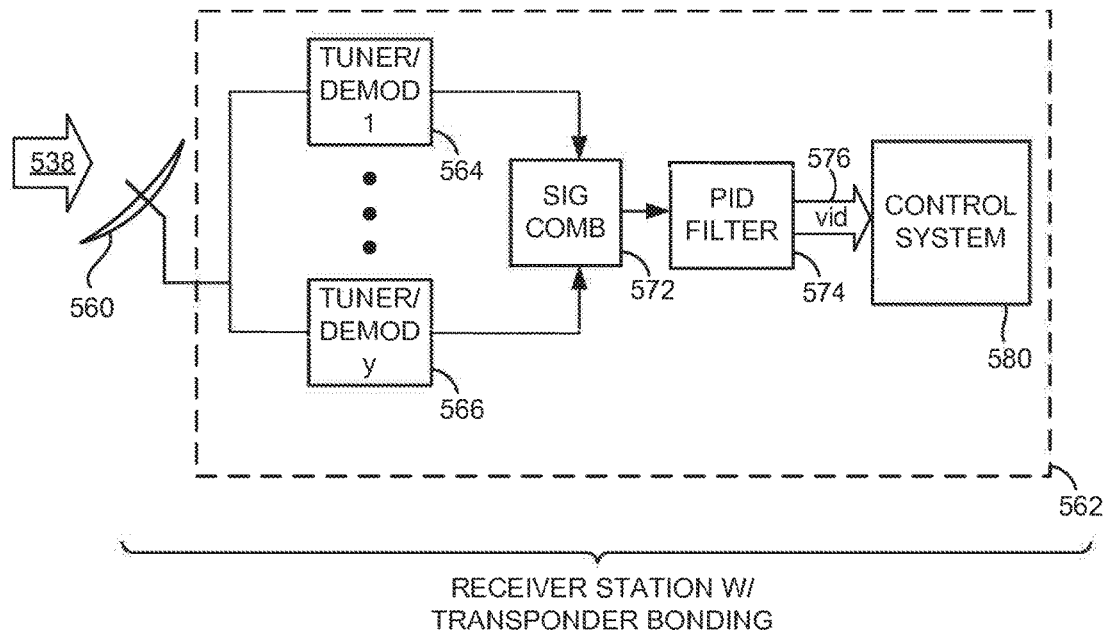
FIG. 5C is a diagram that shows a STB receiving a high bandwidth video data stream from the satellite signal.

FIG. 5A is a diagram that shows distribution of low bandwidth video data streams 502-504 and high bandwidth video data streams 506-508 amongst multiple transponder carriers 516-520. FIG. 5B is a diagram that shows a STB processing a low bandwidth video data stream 550 from a satellite signal 538. FIG. 5C is a diagram that shows a STB processing a high bandwidth video data stream 576 from the satellite signal 538.

Multiple variable bit rate compressed video data streams can be provided to a head end of a content distribution system (e.g., the digital broadcast system 100 of FIG. 1). The video data streams can include one or more low bandwidth video data streams 502-504, and one or more high bandwidth video data streams 506-508. A statistical multiplexer 510 combines groups of the low bandwidth high bandwidth data streams into a combined data stream 512 for transmission over multiple transponder carriers. For example, statmux 510 may combine video data streams 502-508 to generate a combined data stream 512 (i.e., a very high bandwidth data stream). While not shown, the statmux 510 may also combine additional groups of video data streams into additional combined data streams.

The combined data stream 512 is provided to a distributor 514, which functions to divide data from the combined data stream 512 into portions that are assigned to individual transponder carriers. In some examples, the combined data stream 512 may be processed to apply error correction encoding, encrypting, etc. prior to dividing the combined data stream. The combined very high bandwidth data stream is then divided into portions that are assigned to each transponder carrier. The data portions are assigned based at least in part on the type of data in each portion (e.g., whether the data portion includes packets for low bandwidth video data or high bandwidth video data). In particular, for each of the low bandwidth video data streams 502-504, all data from the low bandwidth video data stream is assigned to a single transponder carrier. Also, for at least one of the high bandwidth video data streams 506-508, data from the high bandwidth video data stream is divided amongst multiple ones of the transponder carriers. For instance, for the high bandwidth video data stream 506, a first portion of data from that stream can be assigned to first transponder carrier, and a second portion can be assigned to a second transponder carrier. At least for data from data streams that are divided amongst more than one of the transponder carriers (e.g., the high bandwidth video data streams), each portion can be marked to allow the very high bandwidth combined data stream to be reassembled upon receipt (e.g., with header data that indicates the relationship of each portion with respect to others). The distributor 514 outputs data streams 516, 518, and 520, that are each associated with an individual transponder carrier.

In some cases, the distributor 514 may function such that data for at least one of the received high bandwidth video data streams 506-508 is distributed amongst three transponder carriers. Once generated, the data streams 516, 518, 520 for each transponder carrier can be modulated using modulators 522-526. A separate modulator may be provided for each transponder carrier. Thus, the combined data stream 512 can be distributed amongst data streams 516, 518, 520 and those data streams can be modulated via modulators 522, 524, 526. However, data for each of the low bandwidth video data streams 502, 504 is distributed such that all data for a given one of the low bandwidth video data streams is assigned to a single one of the data streams 516, 518, 520. The modulated signals can then be provided to uplink antenna 528, which transmits the uplink signal 530 to satellite 532. At the satellite 532, each transponder carrier within the uplink signal 530 can be processed by a respective transponder 534, 536, which generates a corresponding downlink signal 538. The resulting downlink signal 538 thus corresponds to the uplink signal 530 and includes information indicative of the original video data streams 502-408.

At a first receiver station, shown in FIG. 5B, the downlink signal 538 is received by an antenna 540, which is coupled to a STB 542. The STB 542 can be a legacy device that is not equipped with hardware components for receiving (e.g., tuning and demodulating) transponder bonded signals, similar to the STB 334 described in connection with FIG. 3B. Thus, the STB 542 can be used to extract a low bandwidth video data stream 550 that is not divided amongst multiple transponder carriers. The incoming antenna signal is processed by a tuner/demodulator 544 and a packet ID filter 548 to extract the desired video data stream 550 that is processed by a control system 552. In some aspects, the STB 542 can function similarly to the STB 200 described above in connection with FIG. 2 to extract particular video data streams in accordance with user input and display that content on one or more displays or record that content for later viewing.

Thus, as shown in FIG. 5B, a low bandwidth video data stream 550 can be extracted using tuner/demodulator 544, which tunes to a carrier associated with video data stream 550 and provides a demodulated signal for that carrier to the packet ID filter 548, which identifies particular data packets within the data stream with packet identifiers that correspond to the desired video data stream 550. The packet ID filter 548 then filters the combined data stream to extract only the packets for the desired video data stream 550, which is then provided to the control system 552. Moreover, while not shown, the STB 542 can include multiple sets of tuner/demodulators and packet ID filters so as to extract multiple low bandwidth video data streams in parallel, such as when one incoming video program is being viewed and one or more additional programs are being recorded for later viewing or displayed on another display device.

The carriers and packet identifiers for particular video data streams can be identified by the control system 552 based on overhead messaging provided to the control system 552 via another channel of the incoming antenna signal 538 (or perhaps via a network connection) and which indicates carriers, packet identifiers, decryption algorithms, etc., for a given video data stream that may be selected for viewing/recording by a subscriber.

At another receiver station, shown in FIG. 5C, the same downlink signal 538 is received by an antenna 560, which is coupled to a STB 562. The STB 562 can be a device that is equipped with hardware components for demodulating and decoding transponder bonded signals, similar to the STB 442 described in connection with FIG. 4B. Thus, the STB 562 can be used to extract a high bandwidth video data stream 576 that is divided amongst multiple transponder carriers. The incoming antenna signal is processed by a set of tuner/demodulators 564, 566, a signal combiner 572, and a packet ID filter 574 to extract a desired video data stream 576 that is processed by a control system 580. In some respects, the STB 562 can function similarly to the STB 200 described above in connection with FIG. 2 to extract particular video data streams in accordance with user input and display that content on one or more displays or record that content for later viewing.

Thus, as shown in FIG. 5C, a high bandwidth video data stream 574 can be extracted using a group of tuner/demodulators 564, 566, which tune to respective carriers associated with video data stream 576 and provide demodulated signals. The tuner/demodulators 564, 566 may be tuned to demodulate signals used to carry a data stream distributed across multiple carriers (i.e., the set of carriers used to carry the data stream including the high bandwidth video data stream 576). The tuner/demodulators 564, 566 provide the resulting data to the signal combiner 572. The signal combiner 572 may be configured to assemble the demodulated signals using markers that indicate the relative relationship amongst portions of the very high bandwidth data stream from each transponder carrier. The signal combiner 472 provides the combined, very high bandwidth data to the packet ID filter 574, which identifies particular data packets within the combined data stream with packet identifiers that correspond to the desired video data stream 576. The packet ID filter 574 then filters the combined data stream to extract only the packets for the desired video data stream 576, which is then provided to the control system 580. Moreover, while not shown, the STB 562 can include multiple sets of tuner/demodulators and packet ID filters so as to extract multiple high bandwidth video data streams in parallel, such as when one incoming video program is being viewed and one or more additional programs are being recorded for later viewing or displayed on another display device. Further still, the STB 562 may be operable to additionally or alternatively extract one or more low bandwidth video data streams while extracting one or more high bandwidth video data streams.

The carriers and packet identifiers for particular video data streams can be identified by the control system 580 based on overhead messaging provided to the control system 580 via another channel of the incoming antenna signal 538 (or perhaps via a network connection) and which indicates carriers, packet identifiers, decryption algorithms, etc., for a given video data stream that may be selected for viewing/recording by a subscriber.

IV. EXAMPLE OPERATIONS

Figure 6:
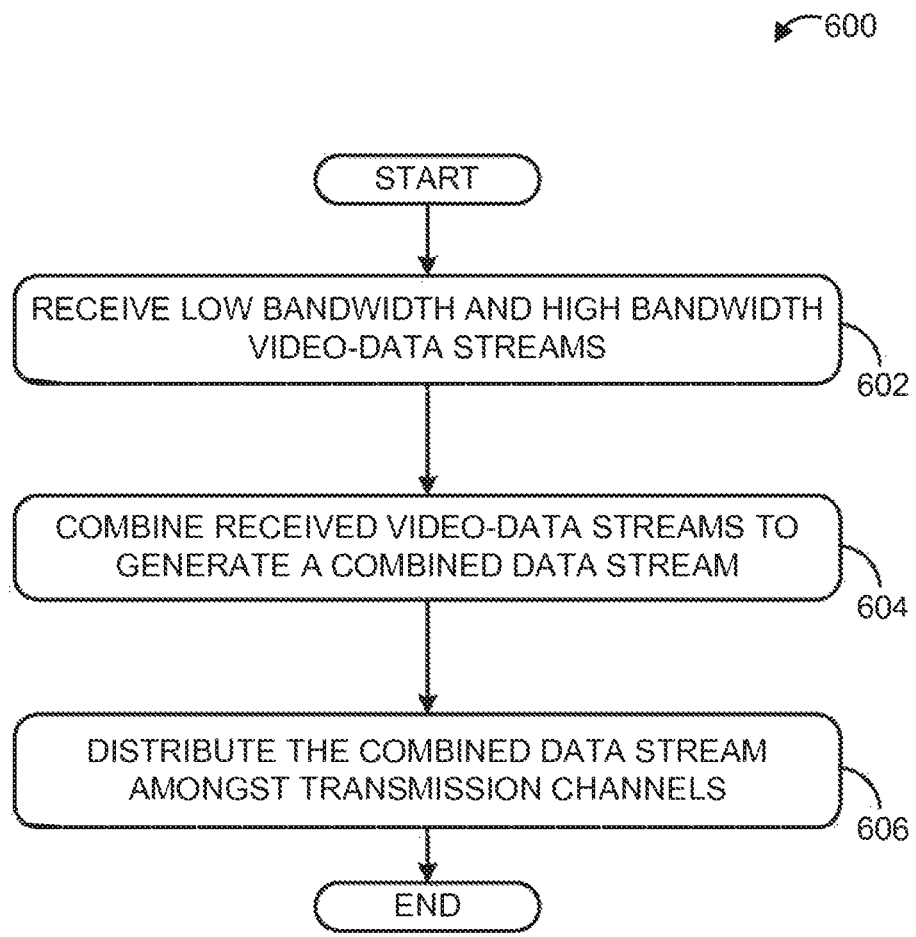
FIG. 6 is a flowchart of an example process that can be performed by an example content distribution system.

FIG. 6 is a flowchart of an example process 600 that can be performed by an example content distribution system. The process 600 may be performed using the head end 102 described in connection with FIG. 1, and may be performed by a device or components of one or more devices.

At block 602, multiple video-data streams can be received. The video-data streams can include both high bandwidth video-data streams (e.g., 4KTV streams) and low bandwidth video-data streams (e.g., HDTV streams). For example, the head end 102 may receive video-data streams from video sources 114a, 114n, some of which are high bandwidth video data streams and some of which are high bandwidth video-data streams. The video-data streams may be compressed according to various techniques and the video-data streams may therefore be variable bit-rate data streams. However, the high bandwidth video-data streams can have a greater peak bit-rate than the low bandwidth video-data streams.

At block 604, the received video-data streams can be combined to generate a combined data stream. The combined data stream can include portions of data (e.g., packets) from the multiple video-data streams combined together. The combined data stream therefore includes data for each of the original video-data streams. In some cases, data within the combined data stream can be identified by packet identifiers, and data packets from different video-data streams can be identified by different packet identifiers. As such, a given video-data stream can be subsequently generated from the combined data stream using data packets with particular packet identifiers associated with the given video-data stream. Once generated, the combined data stream may be processed to apply error correction, encryption or another process, for example.

At block 606, the combined data stream can be distributed amongst multiple transmission channels. The distribution can be performed by assigning data to each of the channels. The assignment process treats data from low bandwidth video-data streams differently than data from high bandwidth video-data streams. In particular, data in the combined data stream is assigned amongst the channels such that all data for a given low bandwidth video-data streams is assigned to a single one of the channels. As a result, the given low bandwidth video-data stream can be generated within a STB based on reception (and processing) of the single channel, as described in connection with FIG. 5B. On the other hand, data for at least one of the high bandwidth video-data streams is divided between more than one of the channels. As a result, that high bandwidth video-data stream can be generated within a STB based on reception of all of those channels, and combining the demodulated data signals to recover the combined data stream. The high bandwidth video-data stream can then be recovered by filtering the combined data stream using a packet ID filter, as described in connection with FIG. 5C. In some examples, as a result of the distribution of block 606, at least one transmission channel can have data from both a low bandwidth video-data stream and a high bandwidth video-data stream. For instance, a common transmission channel can be used to carry both all data from a given low bandwidth video-data stream and at least a portion of data from a high bandwidth video-data stream.

In some cases, the distribution performed in block 606 may involve assigning packet identifiers to data from each of the video-data streams. The packet identifiers can then be used to determine how to distribute the data amongst transmission channels. Packet identifiers in a first range may be assigned to data packets from low bandwidth video-data streams, and packet identifiers in a second range may be assigned to data packets from high bandwidth video-data streams. During distribution, the distributor can determine whether a given data packet has an identifier in the first range or the second range. If the packet identifier is in the first range, the distributor can assign the data packet (and all other data packets for the same video-data stream) to a single transmission channel. As such, a legacy STB that lacks transponder bonding capabilities can still receive and decode the low bandwidth video-data stream by demodulating the single channel and filtering for packet identifiers associated with the desired low bandwidth video-data stream. Additional data on the same transmission channel, such as data packets for transponder bonded data streams, are filtered out by the packet ID filter and ignored by the legacy STB.

On the other hand, if the packet identifier is in the second range, the distributor can assign the data packet (and other data packets for the same video-data stream) to be divided amongst two or more transmission channels. For example, for high bandwidth video-data streams, the distributor can use transponder bonding to transmit the high bandwidth video-data streams. At least in some cases, the distributor may mix data from a high bandwidth video data stream and data from a low bandwidth video-data stream on a single transmission channel. As a result, the high bandwidth video-data stream can be received by a STB configured to receive transponder bonded signals (e.g., by demodulating multiple channels in parallel, combining the demodulated signals into a very high bandwidth data stream, and then filtering the combined data stream for the desired high bandwidth video-data stream).

Other examples are also possible in which data from low bandwidth video-data streams and high bandwidth video-data streams are distributed amongst multiple transmission channels in a manner that accounts for the type of data assigned to each transmission channel.

V. CONCLUSION

While the processes described herein illustrate a number of blocks that are in a sequential order, these blocks may also be performed in parallel or in a different order than those described herein. Also, the various blocks may be combined into fewer blocks, or divided into additional blocks. In addition, it should be understood that the flowcharts show functionality and operation of possible implementations of the present embodiments, though other implementations are also possible. Moreover, each block in the flowcharts may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device, comprising:
   a processing system including a processor; and
   a memory storing executable instructions that, when executed by the processing system, perform operations comprising:
      dividing a high bandwidth data stream into a plurality of packets identified by a first range of packet identifiers;
      multiplexing transmission data for transmission over a first channel in a first network via a first communication protocol, the transmission data comprising a low bandwidth data stream and a first portion of the high bandwidth data stream comprising packets of the plurality of packets, wherein the first portion of the high bandwidth data stream includes the first range of packet identifiers, wherein the low bandwidth data stream includes a second range of packet identifiers, and wherein an identification of the first range of packet identifiers is transmitted via a second communication protocol over another channel in a second network different from the first network, wherein the second communication protocol is different from the first communication protocol; and transmitting, according to the first communication protocol, a single combined data stream that includes the transmission data over a plurality of channels via the first network, wherein the plurality of channels includes the first channel.

2. The device of claim 1, wherein a recipient device receiving the single combined data stream obtains the first portion from the single combined data stream by filtering the portion of the single combined data stream based upon the identification of the first range of packet identifiers.

3. The device of claim 2, wherein the filtering is further based upon the second range of packet identifiers associated with the low bandwidth data stream.

4. The device of claim 1, wherein a second channel of the plurality of channels carries a second portion of the high bandwidth data stream, wherein the second channel is distinct from the first channel, and wherein the second portion of the high bandwidth data stream is distinct from the first portion of the high bandwidth data stream.

5. The device of claim 4, wherein the operations further comprise combining the first portion of the high bandwidth data stream with the second portion of the high bandwidth data stream.

6. The device of claim 1, wherein each of the plurality of channels corresponds to a respective satellite transponder carrier.

7. The device of claim 1, wherein the first portion of the high bandwidth data stream is associated with a video having a frame size with more than 1080 pixel rows.

8. The device of claim 1, wherein the first portion of the high bandwidth data stream is associated with a video having a frame rate greater than 30 frames per second.

9. The device of claim 1, wherein the first communication protocol comprises a satellite-based communication protocol and the second communication protocol comprises a non-satellite-based communication protocol.

10. The device of claim 9, wherein the non-satellite-based communication protocol comprises an Internet communication protocol.

11. The device of claim 1, wherein the operations further comprise receiving control messaging via the second communication protocol, and wherein the control messaging comprises the identification of the first range of packet identifiers.

12. A non-transitory machine-readable storage medium comprising executable instructions that, when executed by a processing system including a processor, perform operations comprising:
dividing a first data stream having a first bandwidth into a plurality of packets identified by a first range of packet identifiers;
multiplexing transmission data for transmission over a first channel in a first network via a first communication protocol, the transmission data comprising a second data stream having a second bandwidth and a first portion of the first data stream, wherein the first bandwidth differs from the second bandwidth, wherein the first portion of the first data stream includes the first range of packet identifiers, wherein the second data stream includes a second range of packet identifiers, and wherein an identification of the first range of packet identifiers is transmitted via a second communication protocol over another channel in a second network different from the first network; and transmitting, according to the first communication protocol, a single combined data stream that includes the transmission data over a plurality of channels via the first network, wherein the plurality of channels includes the first channel.

13. The non-transitory machine-readable storage medium of claim 12, wherein second range of packet identifiers is associated with the second data stream, and wherein the second communication protocol is different from the first communication protocol.

14. The non-transitory machine-readable storage medium of claim 12, wherein a second channel of the plurality of channels carries a second portion of the first data stream, and wherein the second portion of the first data stream is distinct from the first portion of the first data stream.

15. The non-transitory machine-readable storage medium of claim 14, wherein the operations further comprise combining the first portion of the first data stream with the second portion of the first data stream.

16. The non-transitory machine-readable storage medium of claim 14, wherein the first bandwidth of the first data stream is higher than the second bandwidth of the second data stream.

17. A method, comprising:
multiplexing, by a processing system comprising a processor, data for transmission over a first channel in a first network via a first communication protocol, the data comprising a first data stream having a first bandwidth and a first portion of a second data stream having a second bandwidth, wherein the first bandwidth differs from the second bandwidth, wherein the first portion of the second data stream includes a first range of packet identifiers, wherein the first data stream includes a second range of packet identifiers, and wherein an identification of the first range of packet identifiers is transmitted via a second communication protocol in a second network different from the first network; and transmitting, by the processing system according to the first communication protocol, a combined data stream that includes the data over a plurality of channels via the first network, wherein the plurality of channels includes the first channel.

18. The method of claim 17, wherein a recipient device receiving the combined data stream obtains the first portion from the combined data stream by filtering the portion of the combined data stream based upon the identification of the first range of packet identifiers.

19. The method of claim 18, further comprising receiving control messaging, wherein the control messaging is received via the second communication protocol, wherein the filtering is further based upon the second range of packet identifiers associated with the first data stream, and wherein the control messaging comprises the identification of the first range of packet identifiers.

20. The method of claim 17, wherein the second data stream is divided into a plurality of packets identified by the first range of packet identifiers, and wherein the second communication protocol is different from the first communication protocol.

* * * * *